United States Patent
Hutchinson et al.

(10) Patent No.: US 10,686,787 B2
(45) Date of Patent: Jun. 16, 2020

(54) USE OF PERSONAL DEVICE FOR CONVENIENT AND SECURE AUTHENTICATION

(71) Applicant: Gemalto Inc., Austin, TX (US)

(72) Inventors: Michael Hutchinson, Cedar Park, TX (US); HongQian Karen Lu, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 320 days.

(21) Appl. No.: 15/380,204

(22) Filed: Dec. 15, 2016

(65) Prior Publication Data

US 2018/0176223 A1 Jun. 21, 2018

(51) Int. Cl.
*H04L 29/06* (2006.01)
*H04L 9/16* (2006.01)
(Continued)

(52) U.S. Cl.
CPC ............ *H04L 63/10* (2013.01); *H04L 9/0825* (2013.01); *H04L 9/16* (2013.01); *H04L 9/3226* (2013.01);
(Continued)

(58) Field of Classification Search
CPC . H04L 63/10; H04L 63/0435; H04L 63/0442; H04L 63/061; H04L 63/083;
(Continued)

(56) References Cited

U.S. PATENT DOCUMENTS 5,590,199 A 12/1996 Krajewski, Jr. et al.
5,742,756 A * 4/1998 Dillaway ................ G06F 21/34
380/32
(Continued)

FOREIGN PATENT DOCUMENTS

EP 2 317 709 A1 5/2011

OTHER PUBLICATIONS

Notification of Transmittal of the International Search Report and the Written Opinion of the International Searching Authority (Forms PCT/ISA/220, PCT/ISA/210, and PCT/ISA/237) dated Jan. 25, 2018, in the corresponding International Application No. PCT/EP2017/079719. (13 pages).

*Primary Examiner* — Saleh Najjar
*Assistant Examiner* — Devin E Almeida
(74) *Attorney, Agent, or Firm* — Buchanan Ingersoll & Rooney PC

(57) ABSTRACT

The present invention relates to a method to authenticate a user using an authenticator at an access device using another registered device named personal device, said authenticator being stored by the access device after registration of the personal device comprising a double encryption using an access device's secret key and a personal device's public key to be retrieved at each request of authentication received from the personal device, encrypted using a session key and sent with the session key encrypted using the personal device's public key to the personal device for partial decryption using the decrypted session key and the personal device's private key, re-encryption using the session key and sending back to the access device for total decryption of the authenticator, using the session key and the access device's secret key, and use of the thus decrypted authenticator to authenticate at the access device.

14 Claims, 3 Drawing Sheets

(51) Int. Cl.
*H04W 12/06* (2009.01)
*H04L 9/08* (2006.01)
*H04L 9/32* (2006.01)
*H04W 12/08* (2009.01)

(52) U.S. Cl.
CPC ........ *H04L 9/3247* (2013.01); *H04L 63/0435* (2013.01); *H04L 63/0442* (2013.01); *H04L 63/061* (2013.01); *H04L 63/083* (2013.01); *H04L 63/0853* (2013.01); *H04W 12/06* (2013.01); *H04L 63/06* (2013.01); *H04L 2209/76* (2013.01); *H04W 12/08* (2013.01)

(58) Field of Classification Search
CPC ..... H04L 63/0853; H04L 9/0825; H04L 9/16; H04L 9/3226; H04L 9/3247; H04W 12/06
See application file for complete search history.

(56) References Cited

U.S. PATENT DOCUMENTS

| | | | | |
|---|---|---|---|---|
| 5,875,248 | A * | 2/1999 | Lewis | G06Q 20/341 713/168 |
| 5,944,794 | A * | 8/1999 | Okamoto | G06F 21/6218 380/30 |
| 7,231,517 | B1 * | 6/2007 | Mashayekhi | H04L 63/045 709/229 |
| 7,472,270 | B2 * | 12/2008 | Evans | G06F 21/10 380/229 |
| 8,209,744 | B2 * | 6/2012 | Zhu | G06Q 10/02 380/44 |
| 8,290,165 | B2 * | 10/2012 | Allen | H04L 9/0825 380/277 |
| 8,763,097 | B2 * | 6/2014 | Bhatnagar | G06F 21/35 726/5 |
| 2002/0194476 | A1 * | 12/2002 | Lewis | H04L 9/3271 713/169 |

* cited by examiner

USE OF PERSONAL DEVICE FOR CONVENIENT AND SECURE AUTHENTICATION

FIELD OF THE INVENTION

The present invention relates to a method to authenticate a user using an authenticator at an access device using a different device, a personal device.

The invention also pertains to an access device and to a personal device implementing corresponding step of said method.

BACKGROUND OF THE INVENTION

The rapid expansion of Internet services enables people to do increasingly more things online, e.g. work, communicate, shop, bank, entertain, etc. Many objects used in people's lives, such as doors, electronic devices, cars, etc. are also connected to the Internet.

For Internet services, a user typically logs into his/her computer and then logs into the service he/she wants to use. The login typically requires a username and password, and optionally another factor of authentication. It is well known that passwords are a weak authentication scheme and are not convenient, especially when one has to manage a large number of them.

The latest technology advancements have brought a variety of smaller personal devices into people's lives, e.g. cell phones, smart watches, fitness trackers, smart clothes, etc. People have these devices with them all the times.

Some of these devices have security features and cryptographic capabilities, which can protect data and their communication with the outside. Users are able to authenticate to their devices via different means, e.g. by knowledge (e.g. PIN) or biometrics.

When a user has a computer and one or more other personal devices, the user needs to authenticate to each one of them individually in order to use them. This is inconvenient and can be insecure if the user has the same short password or PIN for all the different devices. This invention provides a solution that mitigates the problem.

SUMMARY OF THE INVENTION

The present invention aims at providing a simple and secure solution enabling to use diverse authentication delegation on personal devices.

The present invention is defined, in its broadest sense, as a method to authenticate a user using an authenticator at an access device using another registered device named personal device, said authenticator being stored by the access device after registration of the personal device comprising a double encryption using an access device's secret key and a personal device's public key to be retrieved at each request of authentication received from the personal device, encrypted using a session key and sent with the session key encrypted using the personal device's public key to the personal device for partial decryption using the decrypted session key and the personal device's private key, re-encryption using the session key and sending back to the access device for total decryption of the authenticator, using the session key and the access device's secret key, and use of the thus decrypted authenticator to authenticate at the access device.

The invention provides a solution to the problem above by requiring both the access device and the personal device to participate in the authentication process. The access device holds a double personal+access encrypted authentication information which is useless without the access to the personal device. The personal device is used to convert the access device information into a format that the access device can use for authentication.

To use the solution, a user must first register a cryptographic capable personal device to the access device. Once authenticated to the personal device and the personal device is close to the access device such that a communication is established, the user can login to the access device automatically. The solution of the invention is very convenient as there is no need to authenticate multiple times, as the same personal device can be used to access multiple access devices. In addition, the user do not need any more to type long complex authenticator.

The invention can thus be used for login to remote services as any user's login credentials for remote services can be double personal+access encrypted according to the invention using the access device's secret key and the personal device's public key.

The invention further improves the security of the access device and user's accounts as the user can setup a long complex authenticator without having to enter it each time, as it makes keystroke loggers ineffective and as the presence of the personal device adds another authentication factor.

Besides, it can be here noted that the personal device authentication technology can be improved without needing to make change to the access device authentication technology. The range of applications is wide.

According to a particular implementation, the method of the invention comprises the steps of:

for the user, authenticating to a personal device having a personal device identifier and associated to a user identifier and request login to the access device using the personal device, pairing the access device and the personal device, for the personal device, automatically requesting authentication to the access device using the user identifier and the personal device identifier, for the access device, retrieving a double personal+access encrypted authenticator using the user identifier, said double personal+access encrypted authenticator being previously generated by the access device in a registration process by the encryption of a user authenticator using a secret key of the access device and a public key of the personal device, previously provided to the access device by the personal device, generating a session key, encrypting the retrieved double personal+ access encrypted authenticator with the session key to obtain a triple session+personal+access encrypted authenticator and encrypting the session key with the public key of the personal device, and sending them to the personal device, for the personal device, decrypting the single personal encrypted session key using its private key, then decrypting the retrieved triple session+personal+access encrypted authenticator using the decrypted session key and then decrypting the decrypted double personal+access encrypted authenticator using the personal device's private key to obtain a decrypted single access encrypted authenticator, and encrypting the thus decrypted single access encrypted authenticator using the decrypted session key to obtain a double session+ access encrypted authenticator and sending it to the access device, for the access device, decrypting the double session+access encrypted authenticator using the session key and decrypting the decrypted single access encrypted authenticator using the access devices secret key and using the decrypted authenticator and the user identifier to authenticate the user.

This implementation is the preferred one as it gives an efficient and simple result in terms of authenticator management and processing. The public key of the personal device was provided during registration.

Even if an attacker can eavesdrop all the communication messages between the access device and the personal device for one authentication, the information cannot be reused for the next authentication because the data in the messages are different each time due to the change of the session key. Advantageously, this feature prevents replay attacks. It is here further noted that the session key is destroyed as soon as the authentication at the access device is finished.

According to a particular implementation of the registration of a personal device, the method comprises the preliminary steps of:
  for the user, logging in at the access device using an authenticator and request the registration of a personal device,
  pairing the personal device with the access device,
  for the personal device, generating a device identifier and a key pair and sending a request for registration including the personal device identifier and the public key of the personal device to the access device,
  for the access device, checking if the personal device identifier is in a device list associated to the received user identifier and, if the personal device identifier is not in the device list, requesting the user to enter an authenticator, encrypting the received authenticator using the secret key of the access device, encrypting the obtained single access encrypted authenticator using the public key of the personal device and storing the obtained double personal+access encrypted authenticator to be used later in the authentication method.

This implementation of the registration leads to a simple and efficient implementation of the invention. The implementation is preferred because the user's authenticator is double encrypted. Even if encrypted authenticator is stolen or wrongfully access, it is useless without the personal device.

According to a particular feature, the method comprises the further step of, for the access device, when retrieving the double personal+access encrypted authenticator, consulting a remote database where encrypted authenticators are stored.

This feature enables to lighten the implementation of the invention at the access device as the management of the database is remote.

According to a specific feature of the registration, the method comprises a further preliminary step of, for the access device, before the device list checking step, retrieving the device list from a remote database where such device lists are stored. It also enables to further secure the access to the database optionally.

This feature means that the device list is not locally managed enabling to lighten the implementation at the access device and, optionally to further secure the access to the device list.

Advantageously, the remote database is stored in a remote server.

This feature gives all the advantages of a remote managed database.

Also advantageously, the personal device is registered for authentication at more than one access device.

This feature enables the personal device to serve for the authentication at diverse and different access devices.

According to an advantageous further feature, the method comprises the preliminary step of, for the access device, sending to the personal device at the end of the registration an access device identifier for the user to select it on the personal device while requesting an authentication at the corresponding access device.

This enables the personal device to display a list of access devices.

According to a convenient feature, the access device identifier is a friendly name, which the user US has chosen to represent the access device.

This enables the user to choose a reference to easily identify and choose the access device he/she wants to access.

According to a specific feature, the personal device generates a new key pair for use for each access device that the personal device registers.

This enables to diversify the cryptographic enabling the authentication. This is an additional security for the authentication at the diverse access device.

The present invention also relates to an access device comprising a login interface for a user to authenticate using an authenticator, a pairing interface to pair the access device with a personal device of a user, a key generator to generate a session key, a cryptographic module to perform encryption/decryption of encrypted authenticator using diverse keys, a connection to a database, said access device being adapted, at each authentication request including a user identifier and a personal device identifier according to the method of the invention, to retrieve, using the user identifier and the personal device identifier, a double personal+access encrypted authenticator from the database, the access device being further adapted to generate a triple session+personal+access encrypted authenticator using a session key generated by the key generator at each authentication request, said access device being further adapted to decrypt a double session+access encrypted authenticator received from the personal device using the session key and the thus decrypted single access encrypted authenticator using its secret key, the login interface being further adapted to use the thus decrypted authenticator and the received user identifier to authenticate the user.

This access device according to the invention enables to implement the invention.

Advantageously, the access device is further adapted, at each registration request, of a personal device, to generate a double personal and access encrypted authenticator using an access device's secret key and a public key of the personal device.

This advantageous feature corresponds to the registration of a personal device.

Finally, the invention relates to a personal device comprising a user interface for a user to trigger an authentication at an access device, a pairing interface to pair the personal device with the access device, a cryptographic module to perform encryption/encryption of encrypted authenticator using personal device keys, said personal device being adapted to generate an automatic authentication request to the access device including a user identifier and a personal device identifier after the user triggered an authentication to the access device on the user interface, said personal device being further adapted to decrypt a single personal encrypted session key received from the access device using its private key and then a triple session+personal+access encrypted authenticator using the decrypted session key and then the decrypted double personal+access encrypted authenticator using its private key to obtain a decrypted single access encrypted authenticator, said personal device being adapted to encrypt the thus decrypted single access encrypted authenticator using the decrypted session key and to send it to the access device.

Such a personal device of the invention is necessary for the full implementation of the invention in collaboration with the access device of the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
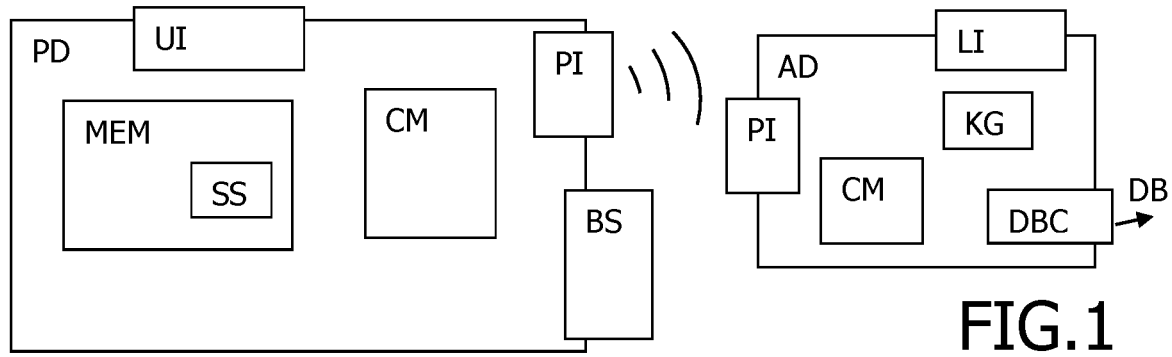
FIG. 1 schematically shows a personal device and an access device according to the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a personal device PD of the invention. This object is the property of a user. It is advantageously a smart watch or a fitness tracker, which the user wears or carries but can be any other personal device as a smartphone or other devices. The personal device PD comprises a user interface UI for a user US to trigger an authentication at an access device AD and a pairing interface PI to pair the personal device PD with the access device AD. For the implementation of the invention, the personal device PD further has a secure storage SS, part of a memory MEM and cryptographic capabilities CM. The personal device PD has also elements BS, typically a biometric sensor, to identify or authenticate the user. Advantageously, such elements BS are authenticating the user via biometrics but other authentication technology can be used. Finally, the personal device PD can communicate with an access device AD when in close proximity. The access device AD is a device to which the user needs to have an access after being authenticated. For example, the access device AD is a user's computer or the access device AD is a user's tablet.

The access device AD comprises a login interface LI for a user US to authenticate using an authenticator PIN and a pairing interface PI to pair the access device AD with a personal device PD of a user US. The access device AD further comprises a key generator KG to generate a session key Ks and a cryptographic module CM to perform encryption/decryption of encrypted authenticator PIN using diverse keys. The access device AD has also a connection DBC to a database DB. The access device AD is adapted, at each authentication request including a user identifier UId and a personal device identifier PDId, to perform the steps of the method of the invention.

The invention has two main parts or phases: registration of the personal device PD and authentication to the access device AD. Other phases are the change of an authenticator on the access device AD and the de-registration of a personal device PD. These phases are illustrated in the following figures.

For the convenience of the descriptions, the Personal Identification Number (PIN) is used as an example of authenticators, which the User uses to authenticate to the AD. Other type of authenticators can be used, for example, a password or a passphrase.

Figure 2:
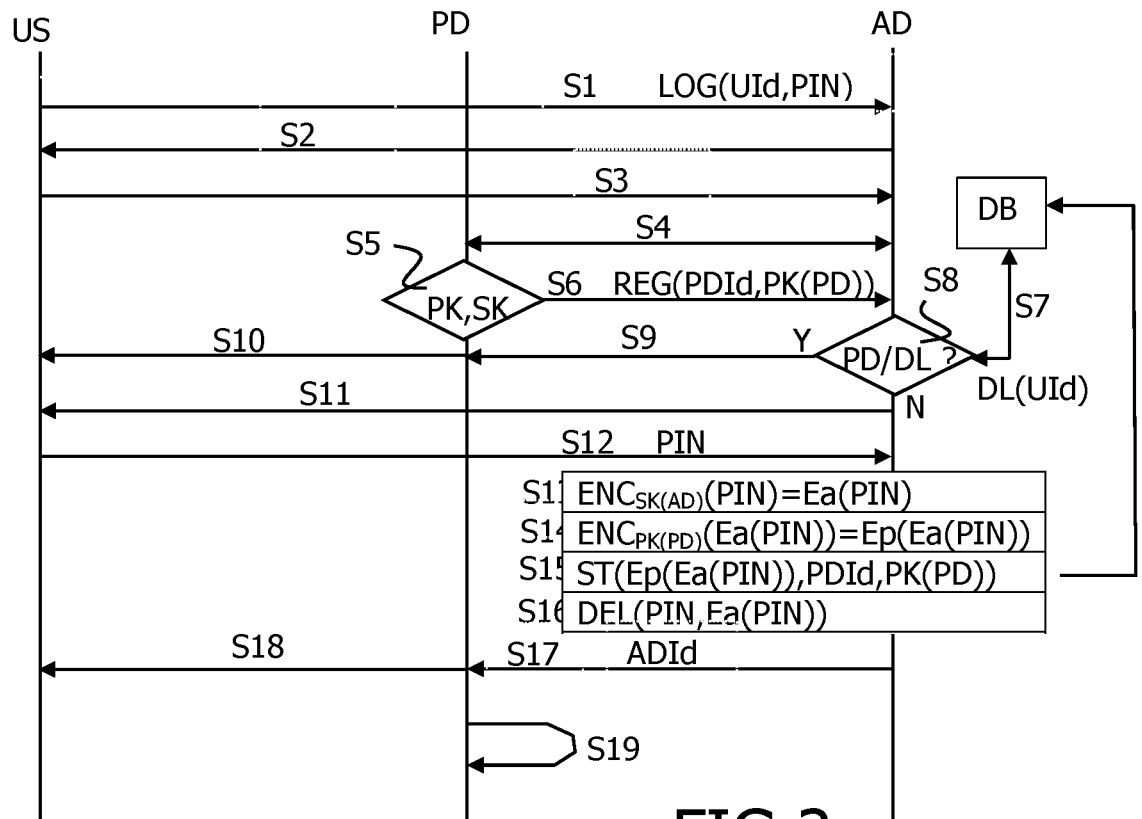
FIG. 2 is a time sequence diagram of a registration of a personal device for the authentication method of the invention.

FIG. 2 illustrates a sequence of registration of a personal device PD. It consists of a user US registering his/her personal device PD to an access device AD on which the user US is already registered with authentication credentials UId, PIN. In a first step S1, the user US thus logs into the access device AD using his/her authentication credentials UId, PIN. Once the login is confirmed by the access device AD in a step S2, the user US requests to register a personal device PD in a step S3. In case of failure of the log step S1, the registration of the personal device PD is refused.

In a step S4, the user then pairs the personal device PD with the access device AD via a communications channel, e.g. Bluetooth.

Then, in a step S5, the personal device PD extracts a personal device identifier PDId and a key pair, consisting of a public key PK(PD) and a secret private key SK(PD). Those data can be stored previously in the memory of the personal device PD or generated and stored in the personal device PD at this point. In a step S6, the personal device PD sends a registration request REQ including the personal device identifier PDId and its public key PK(PD).

In a step S7, the access device AD uses the logged on the user identifier UId to fetch the current user's device list DL(UId) from a related database DB. This database DB can be advantageously remotely managed by an external server to which the access device AD is connected. Such a connection is not a part of the invention. It is here noted that the user's device list DL can be also managed locally by the access device AD itself.

In a step S8, the access device AD checks if the personal device identifier PDId is in the list DL(UId). If yes (case Y), the access device AD informs the personal device PD, in a step S9, and the user US, in a step S10, that the registration was already done.

If the list DL is empty or if the personal device identifier PDId is not in the list DL, the access device AD does the following. In a step S11, it requests again the credential value, here the PIN value, from the user US and receives it in a step S12.

This PIN value is then encrypted, in a step S13, using an access device AD's secret key SK(AD) resulting in an access device AD encrypted PIN Ea(PIN).

The SK(AD) can either be retrieved from secure memory of the access device AD or generated and stored into secure memory of the access device AD at this point. How the secure memory is implemented is not part of this invention. It is here further noted that the access device AD secret key can be a symmetric cryptography key or an asymmetric secret private key.

In a step S14, the access device AD then encrypts the access device AD encrypted PIN Ea(PIN) using the personal device's public key PK(PD) resulting in a double personal+access devices encrypted PIN Ep(Ea(PIN)).

Then the access device AD stores the double personal+access encrypted PIN Ep(Ea(PIN)), the personal device identifier PDId and the corresponding personal device's public key PK(PD) associated with the user identifier UId in the database DB in a step S15.

The PIN value and the access device AD encrypted PIN Ea(PIN) are deleted in a step S16.

Then the access device AD sends an OK flag with the user identifier UId to the personal device PD in a step S17 and the personal device PD displays an information for the user US to be informed in a step S18 that the registration is done. Advantageously, an access device identifier ADId is provided to the personal device PD at this step S17 in order for the personal device PD to store it for later display in an access devices list for the user to choose the access device AD to which he/she wants to authenticate. The personal device PD finally stores the user identifier UId in a step S19. No failure case is listed here.

Figure 3:
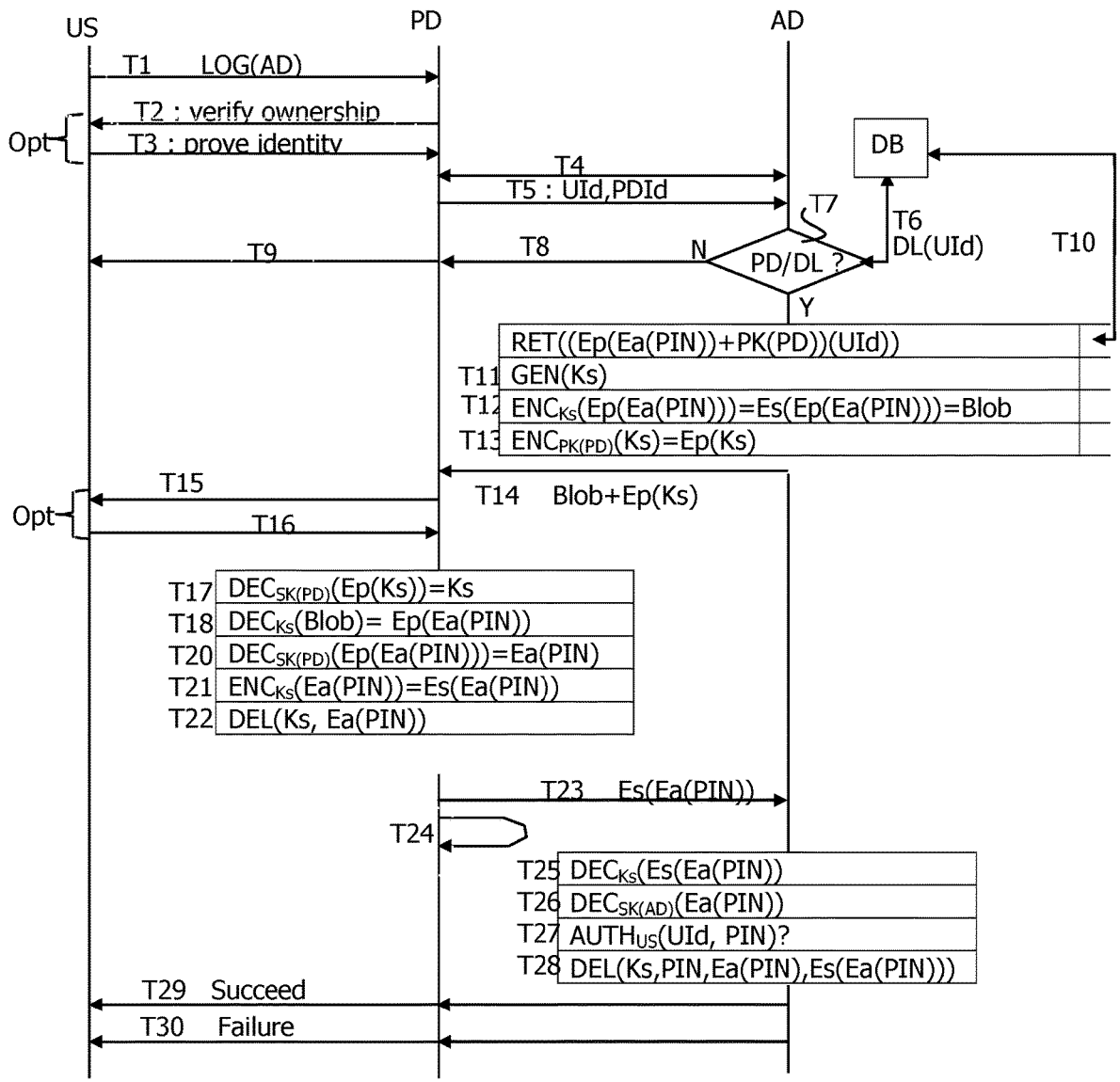
FIG. 3 is a time sequence diagram of an authentication at a personal device to authorize the use of an access device according to the invention.

FIG. 3 illustrates an authentication to an access device AD. It describes how a user US authenticates to an access device AD without any physical action except getting close to the access device AD.

In a first step T1, the user US expresses his/her intention to the personal device PD for logging into his/her access device AD. In two optional steps T2 and T3, the personal device PD may authenticate the user US by verifying ownership or ask the user to authenticate by proving identity using elements BS of the personal device PD. When successful, the personal device PD proceeds to the following steps.

In a step T4, the personal device PD connects to the access device AD and, in a step T5, sends the user identifier UId and the personal device identifier PDId as part of an authentication request.

In a step T6, the access device AD uses the user identifier UId to obtain the registered device list DL(UId) from the database DB.

In a step T7, the access device AD checks if the personal device PD identifier is listed in the list DL(UId). If not (case N), a failure signal is sent to the personal device PD in a step T8, to be displayed to the user US in a step T9. The user US has thus the possibility to trigger a registration for the personal device PD at the access device AD or to login directly to the access device AD itself.

If the personal device identifier PDId is in the list DL(PD), the access device AD does the following steps. In a step T10, the access device AD uses the user identifier UId to find the double personal+access encrypted PIN Ep(Ea(PIN)) and the public key of the personal device PK(PD) in the DB.

Then, in a step T11, the access device AD generates a session key Ks. It then encrypts the double personal+access encrypted PIN Ep(Ea(PIN)) using this session key Ks in a step T12. This operation results in a session value Blob=Es(Ep(Ea(PIN))) being a triple session+personal+access encrypted authenticator.

Then in a step T13, the access device AD encrypts the session key Ks using the public key of the personal device PK(PD). It results in a single personal encrypted session key Ep(Ks). The session value Blob and the single personal encrypted session key Ep(Ks) are sent by the access device AD to the personal device PD in a step T14.

Optionally, the personal device PD may authenticate the user US or ask the user US to authenticate in two steps T15 and T16 similar to previous steps T2 and T3. When authentication is successful, the personal device PD proceeds as follows.

The personal device PD decrypts the single personal encrypted session key Ep(Ks) using its personal device's private key SK(PD) to obtain the session key Ks in a step T17. In a next step T18, the personal device PD decrypts the session value Blob using the decrypted session key Ks to obtain the double personal+access encrypted PIN Ep(Ea(PIN)).

In a step T20, the personal device PD decrypts the double personal and access encrypted PIN Ep(Ea(PIN)) using its personal device PD private key SK(PD) to obtain Ea(PIN). The personal device PD then encrypts, in a step T21, the decrypted access encrypted PIN Ea(PIN) using the decrypted session key Ks. It results in a double session+access encrypted PIN Es(Ea(PIN).

The session key Ks and the single access encrypted PIN Ea(PIN) as decrypted are then deleted in a step T22.

In a step T23, the personal device PD sends the double session+access encrypted PIN Es(Ea(PIN)) to the access device AD and then deletes it in a step T24.

Then the access device AD decrypts the double session+access encrypted PIN Es(Ea(PIN)) with the session key Ks to obtain the single access encrypted PIN Ea(PIN) in a step T25. This step is followed by a step T26 of decryption the single access encrypted PIN Ea(PIN) with its secret key SK(AD) to obtain a decrypted credential value PIN. It is here noted that all the steps above can result in either the correct PIN retrieval or a wrong credential value if any of the above steps is not correctly performed.

In a step T27, the access device AD uses the previously received user identifier UId and the decrypted PIN to authenticate the user US. In a step T28, the session key Ks, the decrypted credential PIN, the decrypted access encrypted PIN Ea(PIN) and the double session+access encrypted PIN Es(Ea(PIN)) are deleted.

If the user authentication is successful, the access device AD sends a success message to the user US and to the personal device PD in a step T29. Otherwise, the access device AD sends a failure message in a step T30.

Figure 4:
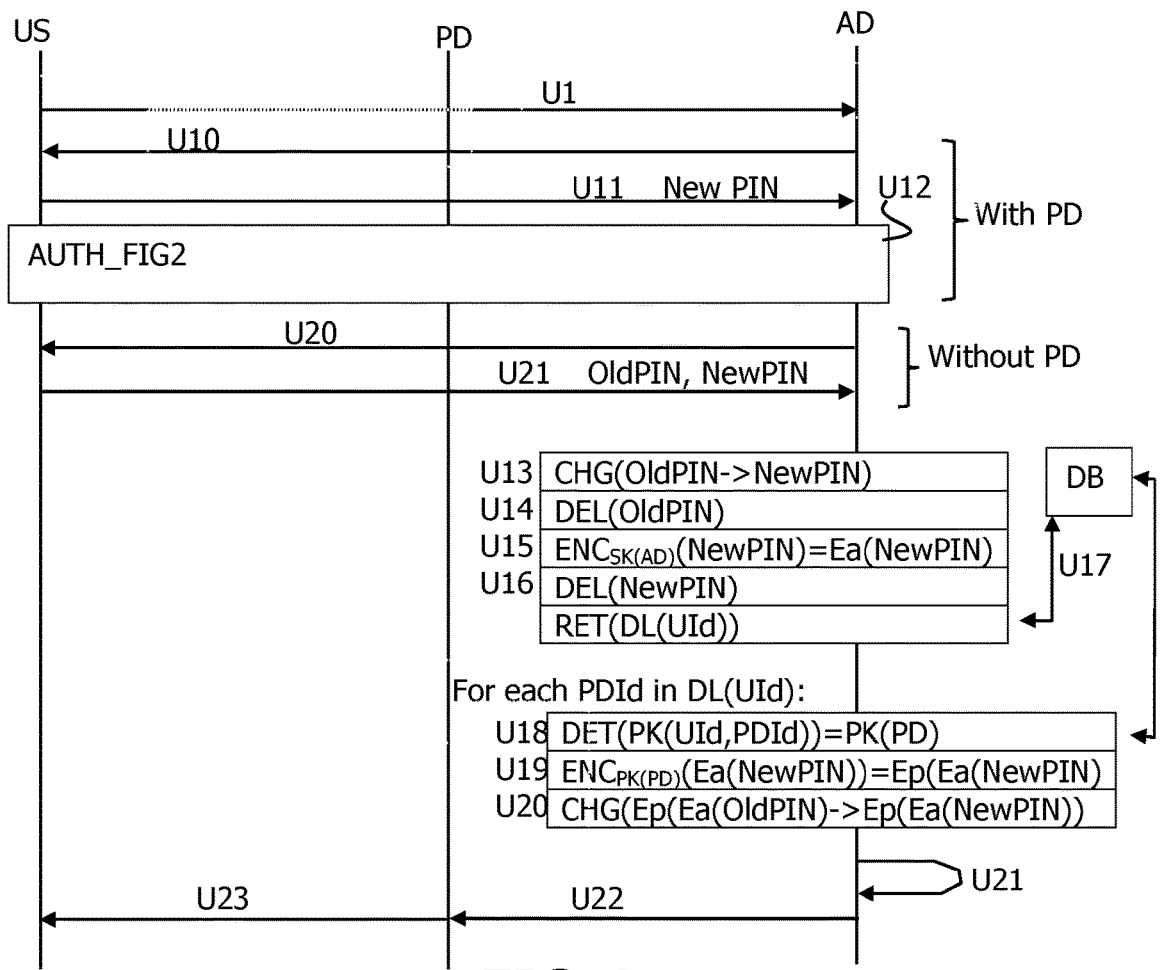
FIG. 4 is a time sequence diagram of a change PIN procedure according to the invention.

FIG. 4 illustrates a flow for a user changing his/her authenticator on the access device AD. The authenticator change, in this example using a PIN, has the following steps according to the invention.

In a first step U1, the user requests to change his/her PIN at the access device AD. In a first alternative where the user has a registered personal device PD and has it with him/her, the access device AD asks the user US to enter a new PIN in a step U10 and the user returns a NewPIN value in a step U11. The access device AD then authenticates the user US as described in the authentication flow on FIG. 3 except that the current PIN value is not deleted until after the change PIN completes. This is schematized within a single step U12 on FIG. 4. It thus obtains the current PIN OldPIN at the same time.

If the user US has no access to a personal device PD, the access device AD asks, in a step U20, the user US to enter both the current PIN OldPIN and the new PIN NewPIN. The user US enters both in a step U21.

Then after this first authentication phase, the access device AD changes the credential PIN from the OldPIN value to the NewPIN value in a step U13. It then deletes the current OldPIN in a step U14.

The access device AD then does the following: it encrypts the NewPIN using its secret key SK(AD), resulting in a single access encrypted new PIN Ea(NewPIN) in a step U15. Then in a step U16, it deletes the NewPIN value.

Then, in a step U17, the access device AD uses the user identifier UId to fetch a device list DL(UId) from the database DB.

Then the access device AD loops through each personal device PD having its identifier PDId in the list DL(UId) and does the following steps for each:

In a step U18, the access device AD uses the user identifier UId and the personal device identifier PDId to find the public key PK(PD) associated the personal device PD in the database DB.

In a step U19, the access device AD encrypts the access encrypted new PIN Ea(NewPIN) using the public key PK(PD), resulting in a double personal+access encrypted new PIN Ep(Ea(NewPIN)).

Then, the double personal+access encrypted old PIN Ep(Ea(OldPIN)) is replaced in the database DB by the new one Ep(Ea(NewPIN)) in a step U20. Then, in a step U21, the access device AD deletes the single access encrypted new PIN Ea(NewPIN).

In steps U22 and U23 the access device AD informs each personal device PD and the user US that the change was done.

Figure 5:
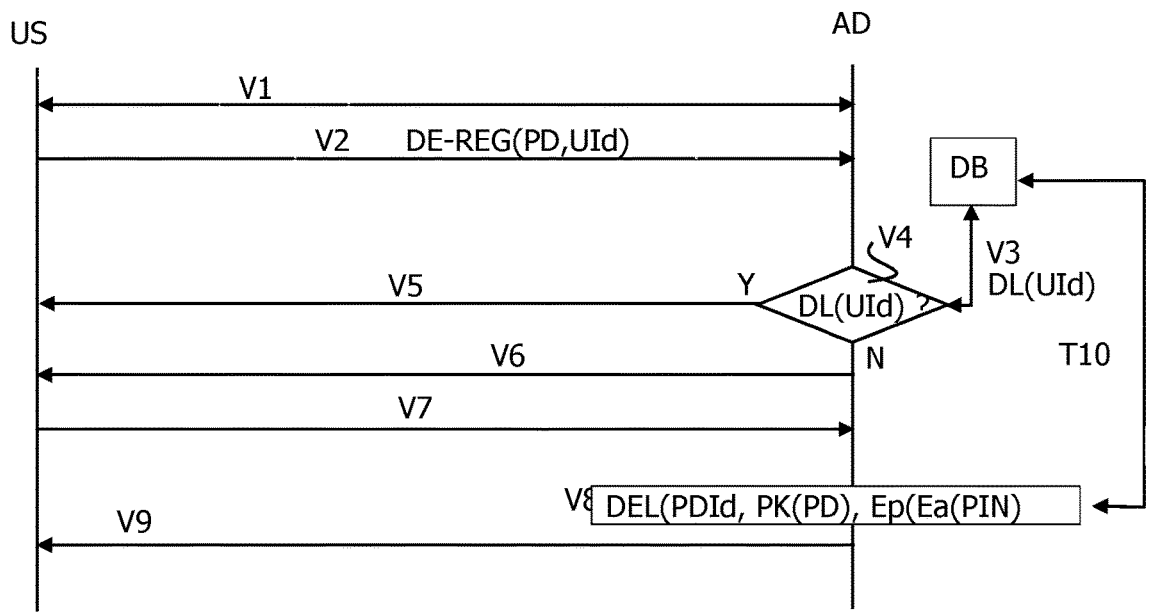
FIG. 5 is a time sequence diagram of a de-registration of a personal device for the authentication method of the invention.

FIG. 5 illustrates a sequence of de-registration of a personal device PD. In a first step V1, the user US logs into the access device AD. Then in a step V2, the user US requests to de-register a personal device PD. Then the access device AD uses the user identifier UId to obtain the registered device list DL(UId) from the DB in a step V3.

Then the access device AD checks the device list DL in a step V4. If the list is empty (case Y), the access device AD tells the user US that there is nothing to de-register in a step V5 and the process ends.

If the list is not empty (case N), the access device AD displays the list DL to user US in a step V6 and the user selects the personal device PD to remove in a step V7. In a step V8, the access device AD removes the selected personal device PD via the device identifier PDId, the personal device's public key PK(PD), and the double personal+access encrypted PIN Ep(Ea(PIN)) from the database DB. Finally, in a step V9, the access device AD informs the user US that the personal device PD is de-registered.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to authenticate a user with a service using an authenticator at an access device using a personal device, said authenticator being stored by the access device after registration of the personal device, the method comprising:
   encrypting, by the access device, the authenticator using a secret key of the access device and a public key of the personal device to produce a double personal+access encrypted authenticator,
   encrypting, by the access device at each request for authentication, the double personal+access encrypted authenticator using a session key to produce a triple session+personal+access encrypted authenticator,
   encrypting, by the access device at each request for authentication, the session key using a public key of the personal device to produce an encrypted session key,
   sending, by the access device at each request for authentication, both the triple session+personal+access encrypted authenticator and the encrypted session key to the personal device,
   decrypting, by the personal device, the encrypted session key using a private key of the personal device to extract the session key,
   partially decrypting, by the personal device, the triple session+personal+access encrypted authenticator using the session key and the private key of the personal device to produce an access encrypted authenticator,
   encrypting, by the personal device, the access encrypted authenticator using the session key to produce a double session+access encrypted authenticator,
   receiving, by the access device, the double session+access encrypted authenticator from the personal device for total decryption of the authenticator, using the session key and the secret key of the access device, and
   sending, by the access device, the authenticator to the service to authenticate the user to the service.

2. The method to authenticate the user according to claim 1, comprising the steps of:
   for the user, authenticating to the personal device having a personal device identifier and associated with a user identifier and request login to the access device on the personal device,
   pairing the access device and the personal device,
   for the personal device, automatically requesting authentication to the access device using the user identifier and the personal device identifier,
   for the access device, retrieving the double personal+access encrypted authenticator using the user identifier,
   for the personal device, sending the double session+access encrypted authenticator to the access device,
   for the access device, decrypting the double session+access encrypted authenticator using the session key to produce the access encrypted authenticator and decrypting the access encrypted authenticator using the secret key of the access device and using the authenticator and the user identifier to authenticate the user.

3. The method according to claim 1, comprising the steps of:
   for the user, logging in at the access device using the authenticator and request the registration of the personal device,
   pairing the personal device with the access device,
   for the personal device, generating a personal device identifier and a key pair and sending a request for registration including the personal device identifier and the public key of the personal device to the access device, for the access device, checking if the personal device identifier is in a device list associated with the user identifier and, if the personal device identifier is not in the device list, requesting the user to enter the authenticator, encrypting the authenticator using the secret key of the access device to produce the access encrypted authenticator, encrypting the access encrypted authenticator using the public key of the personal device to produce the double personal+access encrypted authenticator and storing the double personal+access encrypted authenticator to be used later for authentication.

4. The method according to claim 2, comprising the further step of, for the access device, when retrieving the double personal+access encrypted authenticator, consulting a remote database where encrypted authenticators are stored.

5. The method according to claim 3, comprising a further step of, for the access device, before the checking, retrieving the device list from a remote database where such device lists are stored.

6. The method according to claim 4, wherein the remote database is stored in a remote server.

7. The method according to claim 1 wherein, the personal device is registered for authentication at more than one access device.

8. The method according to claim 3, further comprising the step of, for the access device, sending to the personal device at an end of the registration an access device identifier for the user to select on the personal device while requesting an authentication at the corresponding access device.

9. The method according to claim 8, wherein the access device identifier is a friendly name, which the user has chosen to represent the access device.

10. The method according to claim 3, wherein the personal device generates a new key pair for use for each access device that the personal device registers.

11. The method to authenticate the user according to claim 1, wherein the personal device is prevented from fully decrypting the authenticator.

12. An access device comprising a login interface for a user to authenticate using an authenticator, a pairing interface to pair the access device with a personal device of the user, a key generator to generate a session key, a cryptographic module to perform encryption/decryption of an encrypted authenticator using diverse keys, a connection to a database, said access device being configured, at each authentication request including a user identifier and a personal device identifier, to:

retrieve, using the user identifier and the personal device identifier, a double personal+access encrypted authenticator from the database, wherein the double personal+access encrypted authenticator is produced by encrypting the authenticator using a secret key of the access device and a public key of the personal device, encrypt the double personal+access encrypted authenticator using a session key to produce a triple session+personal+access encrypted authenticator, wherein the session key is generated by the key generator at each authentication request, receive, from the personal device, a double session+access encrypted authenticator produced by:
  partially decrypting the triple session+personal+access encrypted authenticator using the session key and the private key of the personal device to produce an access encrypted authenticator, and
  re-encrypting the access encrypted authenticator using the session key;

decrypt the encrypted double session+access encrypted authenticator received from the personal device using the session key and the secret key of the access device to produce the authenticator, and send, by the access device, the authenticator and the user identifier to a service to authenticate the user to the service.

13. The access device according to claim 12, further configured, at each registration request of the personal device, to generate the double personal+access encrypted authenticator using the secret key of the access device and the public key of the personal device.

14. A personal device comprising a user interface for a user to trigger an authentication at an access device, a pairing interface to pair the personal device with the access device, a cryptographic module to perform encryption/decryption of encrypted authenticator using keys, said personal device being configured to:

generate an automatic authentication request to the access device including a user identifier and a personal device identifier after the user triggered an authentication to the access device on the user interface, decrypt an encrypted session key received from the access device using a private key of the personal device to produce a session key, partially decrypt a triple session+personal+access encrypted authenticator using the session key and the private key of the personal device to produce an access encrypted authenticator, re-encrypt the access encrypted authenticator using the session key to produce a double session+access encrypted authenticator, and send the double session+access encrypted authenticator to the access device for:
  total decryption of the authenticator using the session key and a secret key of the access device; and
  send, by the access device, the authenticator to a service to authenticate the user to the service.

* * * * *